United States Patent [19]

Keller

[11] 4,409,382
[45] Oct. 11, 1983

[54] SYNTHESIS AND POLYMERIZATION OF PHTHALONITRILE MONOMERS CONTAINING MULTIPLE PHENOXY AND SULFONE LINKAGES

[75] Inventor: Teddy M. Keller, Alexandria, Va.

[73] Assignee: The United States of America as represented by the Secretary of the Navy, Washington, D.C.

[21] Appl. No.: 337,893

[22] Filed: Jan. 7, 1982

[51] Int. Cl.³ .......................................... C08G 73/06
[52] U.S. Cl. .............................. 528/173; 260/465 F;
    525/535; 528/166; 528/172; 528/206; 528/210;
    528/271
[58] Field of Search ............... 528/166, 172, 173, 206,
    528/210, 271; 260/465 F; 525/535

[56] References Cited

U.S. PATENT DOCUMENTS

| | | | |
|---|---|---|---|
| 3,886,120 | 5/1975 | Yagi | 260/49 |
| 4,086,209 | 4/1978 | Hara | 260/49 |
| 4,110,314 | 8/1978 | Yagi | 528/26 |
| 4,200,727 | 10/1979 | Blinne | 528/125 |
| 4,223,123 | 9/1980 | Keller et al. | 528/210 |
| 4,234,712 | 11/1980 | Keller et al. | 528/9 |
| 4,238,601 | 12/1980 | Keller et al. | 528/206 |
| 4,259,471 | 3/1981 | Keller et al. | 528/166 |
| 4,304,896 | 12/1981 | Keller et al. | 528/166 |

Primary Examiner—Lester L. Lee
Attorney, Agent, or Firm—Robert F. Beers; William T. Ellis; Thomas E. McDonnell

[57] ABSTRACT

Oligomeric polyarylether sulfone phthalonitrile monomer represented by the formula.

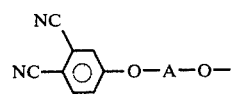

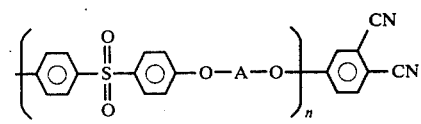

wherein A represents an aromatic unit having from 1 to 3 attached or fused aromatic rings, said rings being attached directly or through an aliphatic group, sulfur, or oxygen; and n represents an average value from 1 to 100 prepared by reacting the product of an dialkaline metal bisphenate and 4,4'-dichlorodiphenyl sulfone with 4-nitrophthalonitrile.

57 Claims, No Drawings

SYNTHESIS AND POLYMERIZATION OF PHTHALONITRILE MONOMERS CONTAINING MULTIPLE PHENOXY AND SULFONE LINKAGES

BACKGROUND OF THE INVENTION

The present invention pertains generally to high-temperature materials and in particular to phthalonitrile monomers and polymers therefrom.

Phthalonitrile polymers constitute a recent and important class of high-temperature materials, having a wide range of uses, such as composite matrices, adhesives, sealants, and even semiconductors. These polymers are prepared from phthalonitriles in which the linking group between the two ortho dinitrile groups separates the dinitrile groups enough to permit polymerization. Presently several bridging groups are known; examples include aliphatic and unsaturated groups, aromatic groups, aliphatic and aromatic diamide groups, and aliphatic and aromatic ether, sulfone and ketone groups.

The chemical and physical properties of the polymers depend primarily on the bridging groups. The groups providing the best properties are those with aromatic, polar and flexible moieties, especially the $-O-\phi-C_3H_6-\phi-O-$ group of U.S. Pat. No. 4,223,123 by Keller et al., the $-O-\phi-SO_2-\phi-O-$ and $-O-\phi-(C=O)-\phi-O-$ groups of U.S. Pat. No. 4,234,712 by Keller et al., and the $-O-C_nH_{2n}-O-$ group of U.S. Pat. No. 4,226,801 by Keller et al. These polymers have exceptional thermal and oxidative stability, low water absorptivity, high strength, good dimensional integrity, and strong adhesion. The aromatic moieties provide the high mechanical strength and modulus and the polar moieties provide the excellent adhesive properties.

Although these polymers have flexible moieties in the linking group, the toughness of these polymers is not high because of the shortness of the bridging group. It is believed that bridging groups from compounds, such as those described in Ahmed et al., *The Properties of Some Poly(arylene ether sulfone)*, J. Appl. Poly. Sci., 25, p. 821-8(1980), should provide extremely tough polymers with all of the other advantageous properties of the aforementioned polymers. Also these polymers should be more easily processed because a phthalonitrile monomer with a short bridging chain is difficult to polymerized. Unfortunately no synthesis is known which can control the degree of polymerization of these polysulfones or link this type of compound with phthalonitrile groups. Thus the problem remains in devising a synthetic method for linking aromatic nuclei with sufficient versatility and freedom from side reactions to effect the synthesis of phthalonitriles with a wide range of molecular-weights.

SUMMARY OF THE INVENTION

It is, therefore, an object of this invention to synthesize phthalonitrile monomers and polymers with excellent thermal and oxidative stability, mechanical strength, and adhesive strength and low water absorptivity.

A further object of this invention is to synthesize phthalonitrile monomers and polymers with exceptional toughness and flexibility.

A still further object of this invention is to synthesize these monomers and polymers easily and inexpensively.

These and other objects of this invention are obtained by phthalonitriles bridged with aromatic nuclei linked by ether and/or sulfone nuclei prepared by reacting the product of an dialkaline bisphenate and 4,4'-dichlorodiphenyl sulfone with 4-nitrophthalonitrile.

DETAILED DESCRIPTION OF THE INVENTION

The phthalonitrile monomers of this invention are represented by the formula:

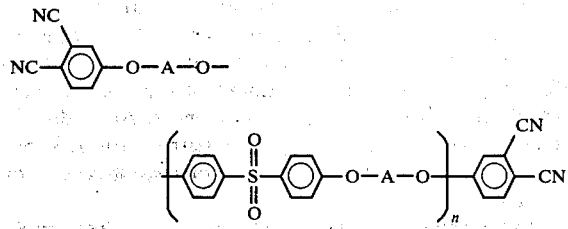

The value of n determines the flexibility and toughness of the resulting polymer. Increasing the value for n increases the ease of polymerization because of the greater separation of the phthalonitrile groups; however, if the value of n becomes too large, polymerization becomes more difficult because of the increased viscosity of the monomer. For n from 1 to 4, the monomers have a definite melting point and can be polymerized to void-free product without the need of a solvent or dispersing medium. For n greater than 4, a solvent or dispersing medium greatly facilitates the polymerization.

It should be noted that the product is void-free only if the solvent or dispersing medium is able to enter into the polymerization. Otherwise, the solvent becomes trapped in the developing polymer and its volatilization produces voids. The solvents which can best enter the polymerization are phthalontrile monomers with a melting point. The phthalonitrile monomers disclosed in U.S. Pat. Nos. 4,223,123; 4,234,712; and 4,238,601, which are incorporated herein by reference, are excellent solvents. So too are the monomers of this invention which have n from 1 to 4.

The preferred amount of solvent is the smallest amount of solvent which provides the desired quality of polymerization. If a void-free, composite-matrix material is to be prepared, the preferred monomers for use as solvents are those with sulfone moieties. The most preferred ones are the monomers of this invention which have n from 1 to 4. An excellent combination is a monomer with n from 1 to 4 in an amount from about 15 to about 40 weight percent of the total monomer weight and a monomer with n from 9 to 25 in amount from about 60 to 85 weight percent of the total monomer weight. Another excellent combination is monomer represented by the formula

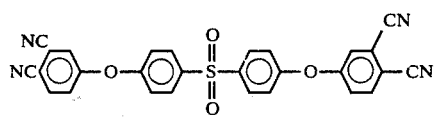

in an amount from 5 to 25 weight percent of the total monomer weight and the balance of a monomer with n from 9 to 25. For monomers with n from 26 to 50, much higher amounts of the above monomer must be used, amounts as high as 85 weight percent. At these levels, the benefits of the higher moleuclar-weight monomers are too diluted to be important.

For applications other than composite matrix materials, much greater latitude in the choice of solvent is possible. For applications, such as adhesives, coatings, sealants, or thin films, the problem of trapped solvent would be much less and consequently nonpolymerizable solvents can be used. The monomers are soluble in any dipolar aprotic solvent, e.g., dimethylsulfoxide, dimethylformamide, and N-methylpyrrolidinone.

Presently, phthalonitrile monomers with n from 51 to 100 cannot be polymerized without voids or be uniformally polymerized on account of the viscous thermoplastic character of these monomers. Accordingly, these monomers would be poor matrix materials, but would be suitable for other uses, such as adhesives or sealants.

The aromatic units represented by "A" in the formula are many and varied. The divalent radicals of benzene, naphthalene, anthracene, diphenyl and phenanthrene are suitable, but the divalent radicals having aromatic rings attached through an aliphatic group, sulfur, or oxygen are preferred. The preferred divalent radicals of this latter class are represented by the formulae

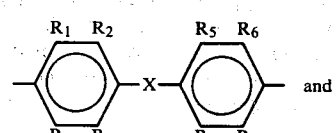

and

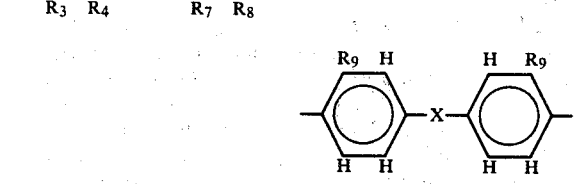

wherein X is selected from the class consisting of —O—, CH$_3$—

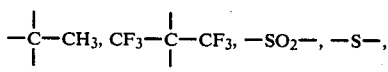

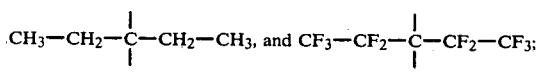

R$_1$, R$_2$, R$_3$, R$_4$, R$_5$, R$_6$, R$_7$, and R$_8$ are selected from the class consisting of hydrogen, fluoride, methyl, and ethyl; and R$_9$ is selected from the class consisting of chloride and bromide. The most preferred groups for "X" are —O—,

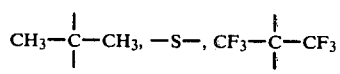

and —SO$_2$—. The least expensive groups are —O—,

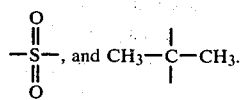

Substitutions on the benzene rings generally lower the thermal stability and resistance to u.v. light; but they increase other desirable properties. For example, fluorinated rings coupled with "X" representing C$_3$F$_6$ or C$_5$F$_{10}$ would provide an extremely hydrophobic and oleopholic polymer which would have great value as a coating, sealant, or adhesive. If a bromide or chloride is substituted on the benzene rings of "A", the resulting polymer would be highly flame retardant. This diversity of groups represented by "A" is a major advantage of the subject group of polymers and their method of preparation.

The synthesis of the monomers proceeds according to the following sequence:

1

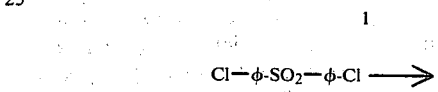

2

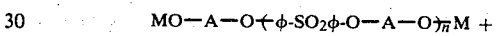

3 wherein A and n are defined as previously; M is an alkali metal selected from the class consisting of lithium, sodium, potassium, and rubidium with sodium and potassium preferred; and it is preferred that the benzene rings are attached at the para position.

In synthesizing intermediate product (1), a bisphenol is admixed in an inert, oxygen-free atmosphere with alkali metal hydroxide in a solvent system consisting of a dipolar aprotic solvent and in benzene, toluene, chlorobenzene, or any other inert, aromatic, low-boiling-point refluxing medium to produce a dialkaline salt of the bisphenol. All water is azeotroped from the system before adding 4,4'-dichlorodiphenyl in an amount such that the dialkaline bisphenate is in excess of the stoichiometric amount. Accordingly, the sulfone-to-salt molar ratio is from about 1:1.2 to about 1:1.9 and preferably from 1:1.4 to 1:1.7. The reaction mixture is refluxed until the reaction is complete as determined by the amount of yield since the yield is almost quantitative. The amount of excess dialkaline bisphenate determines the average molecular weight of the oligomer mixture terminated as an dialkaline metal bisphenate (2).

After cooling to a temperature from about 65 to about 85 degrees C. and preferably from 70 to 80 degrees C., a stoichiometric amount of the oligomer is admixed with 4-nitrophthalonitrile in the same solvent system as before until the reaction is complete, generally on the order of 10 to 20 hours.

The viscous product mixture is then poured into cold water, forming a white solid (3). The white solid is then pulverized; collected by, e.g., suction filtration; washed with water; and dried in an oven at reduced pressure, preferably from 0.5 to 0.75 atm, leaving the oligomeric monomers of this invention.

Depending on the chain length, the character of the polymers from the oligomeric monomer or monomers can be either thermosetting or thermoplastic. Polymers from oligomeric monomers with n from 1 to around 25 are thermosetting. Polymers from monomers with n greater than 25 behave as thermoplastics due to the predominant effect of the inner connecting polysulfone moiety between the terminating phthalonitrile units. It should be noted that the transition in properties from thermosetting to thermoplastic is gradual with no definite transition point. Monomers with n from 1 to 4 are easy to polymerize because the oligomer melts, thus allowing the molecules to maneuver into position for polymerization. On the other hand, monomers with n greater than 50 are especially difficult to polymerize uniformally and void-free on account of the high viscosity of the oligomer.

As was discussed previously in order to obtain a uniform and void-free polymer, a compound which is used as a solvent to dissolve the oligomeric monomer and which can co-polymerize with the monomer is added. Low-molecular-weight phthalonitrile monomers can be used to dissolve the monomers of this invention. Additional examples of suitable monomers are those in U.S. Pat. Nos. 3,993,631; 4,056,560; 4,057,569; and 4,067,860 and are incorporated herein by reference. Although the amide-bridged phthalonitriles polymerize the phthalonitriles of this invention quicker, the thermal stability of the resulting polymer is lower. The preferred phthalonitrile solvents are represented by the formulae: Ph—O—φ—C$_n$H$_{2n}$—φ—O—Ph, Ph—O—φ—SO$_2$—φ—O—Ph, and Ph—O—φ—(CO)—φ—O—Ph wherein Ph represents the phthalonitrile group and the benzene rings are attached at the para position. The subject phthalonitrile monomers with n from 1 to 4 can also be used as solvents. It is preferred that at least about 50 weight percent of the monomers of the present invention be used in order to obtain a substantial contribution to the properties of the final polymers from these monomers. A highly preferred combination is two phthalonitrile monomers of this invention, one with n from 1 to 4 and the other with n from 9 to 15. The higher molecular weight monomer is present in an amount from about 80 to about 95 weight percent.

If a highly fluorinated polymer is wanted, than the monomers represented by the formula Ph—O—φ—C$_{n'}$F$_{2n'}$—φ—O—Ph wherein n' is from 1 to 4 would be used as the solvent for the present monomers with A representing

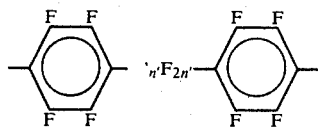

wherein n' is from 3 to 5. The preferred amount would, of course, be at least enough to dissolve the subject monomer. Besides that amount, the amount would depend on the intended use. It is also possible to use the subject monomer with A representing (φF$_4$)C$_{n'}$F$_{2n'}$(φF$_4$) and "n" from 1 to 4 as the solvent.

If the intended application can tolerate some voids, other solvents can be used to dissolve the oligomeric monomers. Any dipolar aprotic solvent can be used, e.g. acetonitrile, dimethyl sulfoxide (DMSO), dimethyl acetamide, or N-methyl pyrrolidinone (NMP). It is also possible to mix the monomers in a dispersing medium, but the resulting polymer would have considerable number of voids.

Neat polymerization comprises heating a phthalonitrile at a temperature from at least about the melting point or the softening point of the monomer to about the decomposition temperature of the resulting polymer and heating until the monomer has been completely polymerized. It should be noted again that the monomers without a melting point do not form a void-free or uniform polymer if they are neat-polymerized. The preferred polymerization or cure temperature is from 10° C. above the melting or softening point of the monomer to 30° C. below the decomposition temperature of the resulting resin. The decomposition temperature is the temperature at which a polymer sample starts to lose weight as determined by TGA analysis. The polymer is usually postcured at a temperature from about 50° to 15° C. and preferably from 30° to 20° C. below the decomposition temperature. The length of the cure and postcure depends on the polymer and the properties desired.

It is possible to terminate the polymerization at the B-stage which is determined by an increase in viscosity. Upon cooling, the B-staged prepolymer is a frangible solid which can be broken into a powder. The powder can be stored for a long period of time if kept at a temperature below 100° C. and away from u.v. exposure. To use the B-staged resin, the powder is placed in a mold or admixed with, e.g., graphite fibers and is heated to the above cure temperature range. The cure proceeds as previously.

Polymerization in a dipolar aprotic solvent comprises dissolving a phthalonitrile monomer in a solvent to form a solution, heating the solution until the B-stage is reached, quenching the B-staged prepolymer to room temperature, removing the solvent by reduced pressure, polymerizing the B-stage to the C-stage by heating the prepolymer to the polymerization-temperature range, and curing the prepolymer at the above curing-temperature range.

The rate of polymerization can be increased by the inclusion of a primary amine or a phenol. The preferred amines are meta- and para-phenylenediamine, meta- and para-alkylene dianiline, aminophenyl ether, aminophthalonitrile, cyclohexane bis(alkylamine) wherein said alkyl group has from 1 to 10 carbon atoms, alkylamine or alkyldiamine wherein said alkyl group has from 15 to 25 carbon atoms, and aminophenylsulfone. The preferred phenols are bisphenol-S, bisphenol-A, bisphenol-AF, and bisphenol-A polysulfone represented by the formula:

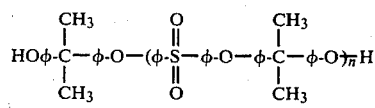

wherein n is an integer from 1 to 5, said phenols having both para and meta attachments of phenyl groups thereof. The amine or phenol is added to the phthalonitrile monomer when melted or in solution. For void-free applications, the amine or the phenol is added in an amount from about 1 to about 10 weight percent of total resin weight; otherwise, the amine can be added in an amount up to 20 weight percent. Further details about the inclusion of a primary amine or a phenol are disclosed in U.S. patent application Ser. Nos. 295,894 and 295,915 which are incorporated herein by reference.

The phthalonitrile monomers, like previous phthalonitrile monomers, can be cured with a metal or metallic salt. In order to minimize gasing, a stoichiometric amount, based on a hypothetical phthalocyanine nucleus formation, is added. Thus, one equivalent of a metal or salt for four equivalents of phthalonitrile monomer is used.

The preferred metals are copper, iron, zinc, and nickel due to the enhanced thermal stability of the resulting resins above 250° C. Examples of other metals which may be used are chromium, molybdenum, vanadium, beryllium, silver, mercury, tin, lead, antimony, calcium, barium, manganese, magnesium, cobalt, palladium and platinum. The preferred metallic salt is stannous chloride. This increases the reaction rate the most and has the least trouble with poor dispersion and voids caused by entrapped gas. These advantages occur only if the stannous chloride is in the dihydrate form. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L., Phthalocyanine Compounds N.Y. Reinhold, 1963, p. 104-141.

Having described the invention in general, the following examples are given as particular embodiments thereof and to demonstrate the practice and advantages thereof. It is understood the examples are given by way of illustration and are not intended to limit the specification or the claims to follow in any manner.

EXAMPLE 1

Synthesis of Oligomeric Polyarylether Sulfone Phthalonitrile Monomer with an Average Molecular Weight of 930 (n=1)

To a 100 ml, three-necked flask was added 4.0 g (17.5 mmol) of recrystallized bisphenol A, 1.5 g (38 mmol, 97% pure) of sodium hydroxide, 1.5 ml of water, 25 ml of dimethyl sulfoxide and 30 ml of toluene. The reaction mixture was thoroughly purged with nitrogen for 15 minutes while slowly heating to 80° C. and then was refluxed for 3 hours. The added water and the water formed as a by-product in the formation of the disodium bisphenate were removed by azeotropic distillation. After the temperature of the refluxing mixture had increased to 140° C., it was assumed that all of the water had been removed and the toluene was removed by distillation. At 160° C., 2.5 g (8.8 mmol) of recrystallized 4,4-dichlorodiphenyl sulfone was added next over a period of 10 minutes. The resulting mixture was stirred overnight (20 hours). The temperature was then reduced to 90°-98° C. and 3.3 g (19.1 mmol) of 4-nitrophthalonitrile was added which resulted in a color change to a dark red. The resulting mixture was stirred for 8 hours. Infrared analysis was used to monitor the extent of the reaction by observing the disappearance of the hydroxyl and nitro absorptions at 3450 and 1539 cm$^{-1}$, respectively. The crude oligomeric mixture was cooled and poured into cold, dilute hydrochloric acid. The off-white solid was collected by suction filtration, pulverized, washed with water and dried at reduced pressure to afford 7.5 g (92%) of oligomeric product, m.p. 115°-125° C.

EXAMPLE 2

Synthesis of Oligomeric Polyarylether Sulfone Phthalonitrile Monomer with an Average Molecular Weight of 2280 (n=4)

A mixture of recrystallized bisphenol A (5.0 g., 21.9 mmol), sodium hydroxide (1.9 g, 48 mmol, 97% pure), 2 ml of water, 30 ml of toluene, and 20 ml of dimethyl sulfoxide was thoroughly flushed with nitrogen for 15 minutes while slowly heating to the reflux temperature of the azeotropic solvent system. The mixture was refluxed to remove the added water and the water formed as a by-product. After 4 hours, the temperature had risen to 140° C. and it was assumed that all of the water had been removed from the reaction system. At 160° C., recrystallized 4,4'-dichlorodiphenyl sulfone (5.0 g., 17.4 mmol) was added next over a period of 10 minutes. The resulting mixture was stirred at 160°-165° C. for 20 hours under an inert atmosphere. After cooling to approximately 110° C., 4-nitrophthalonitrile (1.7 g, 9.8 mmol) was added in one sum. The red reaction mixture was stirred for 16 hours at 110° C. Infrared analysis indicated that the reaction had gone to completion. The oligomeric mixture was poured into 100 ml of methanol. The slightly pink solid was pulverized, collected by suction filtration, washed with 300 ml of 50% aqueous methanol and dried at reduced pressure to afford 9.6 g (96%) of an off-white oligomeric product mixture.

EXAMPLE 3

Synthesis of Oligomeric Polyarylether Sulfone Phthalonitrile Monomer With an Average Molecular Weight of 4980 (n=10)

A mixture of pure bisphenol A (5.0 g, 21.9 mmol), sodium hydroxide (1.9 g, 48 mmol, 97% pure), 2 ml of water, 30 ml of dimethyl sulfoxide, and 30 ml of toluene was thoroughly flushed with nitrogen for 15 minutes while slowly heating to the reflux temperature of the solvent system. The mixture was refluxed for 4 hours during which time the added water and the water formed as a by-product were removed by azeotropic distillation by means of a Dean-Stark trap. After 4 hours, the temperature had risen to 140° C. and it was assumed that most of the water had been removed. The toluene was then removed by atmospheric distillation. At 160° C., pure 4,4-dichlorodiphenyl sulfone (5.7 g, 19.9 mmol) was added over a period of 10 minutes. The resulting mixture was stirred at 160°-165° C. for 18 hours. At this time, the temperature of the reaction mixture was lowered to 110° C., and 4-nitrophthalonitrile (0.26 g, 1.52 mmol) was added. The deep-red mixture was then stirred at 110°-120° C. for 20 hours. Infrared analysis indicated the absence of hydroxyl and nitro absorptions. The mixture was cooled to 60° C. and poured into 100 ml of ethanol. A viscous oil precipitated out. The addition of 40 ml of water caused the viscous residue to solidify. The solid was thoroughly pulverized, collected by suction filtration, washed with 500 ml of water, and dried at reduced pressure to afford 9.5 g (96%) of an amorphous material.

EXAMPLE 4

Synthesis of Oligomeric Polyarylether Sulfone Phthalonitrile Monomer With an Average Molecular Weight of 19,350 (n=43)

A solution of pure bisphenol A (5.0 g, 21.9 mmol) and 20 ml of dimethyl sulfoxide were stirred while purging with nitrogen and heating to 60° C.; whereupon sodium hydroxide (1.9 g, 47.5 mmol, 97% pure) dissolved in 2 ml of water was added. After the solution was heated to 110° C., 30 ml of toluene was added through the condenser to initially fill the Dean-Stark trap with 10 ml being allowed to run into the reaction vessel. The resulting solution was refluxed for 4 hours which resulted in the azeotropic distillation of water from the reaction medium. At 140° C., it was assumed that the water had been removed. The toluene was then distilled under atmospheric conditions. At 160°-165° C., pure 4,4-dichlorodiphenyl sulfone (6.1 g, 21.4 mmol) was added in three stages. The initial amount (6.0 g) was added over a 15 minute period and heated at 160°-165° C. for 18 hours. A small sample of product mixture was removed and analyzed for toughness (film)-brittle. Accordingly, 0.1 g of 4,4-dichlorodiphenyl sulfone was added and the resulting mixture was heated for 24 hours. Analysis (flexibility of film) indicated that the product was somewhat tougher but still brittle. Again, 0.04 g of 4,4-dichlorodiphenyl sulfone was added and the mixture was heated for 72 hours. The mixture was extremely viscous and analysis indicated that the product was fairly flexible. Thus, 15 ml of dry dimethyl sulfoxide was added to reduce the viscosity. 4-Nitrophthalonitrile (0.2 g, 1.1 mmol) was then added at 120° C. and the mixture was heated at this temperature for 24 hours. Infrared analysis indicated that hydroxyl moieties were still present. Therefore, additional 4-nitrophthalonitrile (0.1 g) was added and the reaction mixture was heated at 120° C. for 24 hours. Infrared analysis indicated that the hydroxyl moiety had been consumed. The mixture was cooled to 70° C. and poured into 200 ml of methanol. The white material was pulverized in the methanol, collected by suction filtration, washed with 500 ml of 50 percent aqueous methanol, and dried in an evacuated oven at 150°-160° C. for 8 hours to afford 9.4 g (97%) of an oligomeric product mixture. The material did not melt but did soften at a temperature approaching 300° C.

EXAMPLE 5

Polymerization of Oligomeric Polyarylether Sulfone Phthalonitrile Monomer With an Average Molecular Weight of 930 (n=1)

A 1 g sample of the oligomeric mixture of monomer was placed in an aluminum planchet and placed on a hot plate in a specially designed desiccator for evaluation purposes. The sample was melted and heated at 240°-250° C. for 2 hours under reduced pressure which resulted in the complete elimination of volatiles. The sample was then placed in an oven preheated to 260° C. and heated for 40 hours. The polymer was then postcured at 300° C. for 4 hours. Upon cooling, the polymer was removed from the planchet and found to be void free.

To melt of a second sample (0.77 g), which had been degassed as above, was added 0.01 g of methylene dianiline. The reactants were thoroughly mixed, placed in an oven, and heated at 220° C. for 3 hours, which resulted in the gelation of the sample. The sample was then heated at 250° C. for 70 hours and postcured at 280° C. for 5 hours and at 300° C. for 6 hours, respectively. To the melt of a third sample (2 g), which had been degassed, was added 0.06 g of 4,4-(p-phenylenedioxy)-dianiline. After thoroughly mixing the two reactants, the sample was placed in a 250° C. preheated oven and heated at this temperature for 18 hours (overnight). The polymer was then postcured at 300° C. for 19 hours.

EXAMPLE 6

Polymerization of Oligomeric Polyarylether Sulfone Phthalonitrile Monomer With an Average Molecular Weight of 2280 (n=4)

A 1 g sample was degassed at reduced pressure in the melt at 250°-300° C. The sample was then placed in an oven preheated at 300° C. and heated for 18 hours (overnight). The sample appeared to be slightly rubbery. Thus, the temperature was increased to 320° C. and heated at this temperature for 24 hours. After only 4 hours at 320° C., the sample had completely solidified. The sample was then removed from the oven and cooled. A thin film, which formed on the upper portion of the planchet, indicated flexibility. Moreover, the cured sample exhibited toughness, flexibility, and non-brittleness. When the sample was sanded, the color was found to be yellow in contrast to that observed for shorter spacing units (green) where the polymerizing phthalonitrile unit dominated the color of the polymer. The sample was void-free and was somewhat difficult to remove from the planchet which indicated adhesion between the resin and aluminum, even though the planchet had been sprayed with releasing reagent. A second sample (0.8 g) was placed in an aluminum planchet and heated at various temperatures (280°-330° C.) at full vacuum. The volatiles had been removed after 3 hours. Bisphenol A phthalonitrile (0.3 g) and 0.01 g of 4,4'-(p-phenylenedioxy)dianiline were added and thoroughly mixed. Bisphenol A phthalonitrile served three purposes: (1) since the compound is terminated by phthalonitrile units, it reacted and became incorporated into the polymeric backbone. (2) bisphenol A phthalonitrile melted at approximately 200° C.; (it was possible to process the oligomeric polyarylether sulfone phthalonitrile into a prepolymer at this temperature); and (3) the addition of bisphenol-A phthalonitrile reduced the viscosity of the resulting sample relative to the oligomeric polyarylether sulfone phthalonitrile and thus reduced the processability temperature. The dianiline compound enhanced the cure rate. The resulting sample was heated at 220° C. for 18 hours (overnight). The sample was then postcured at 300° C. for 6 hours and at 320° C. for 24 hours. The polymer appeared fairly tough.

EXAMPLE 7

Polymerization of Oligomeric Polyarylether Sulfone Phthalonitrile Monomer With an Average Molecular Weight of 4980 (n=10)

Polysulfone terminated phthalonitrile (0.8 g) and bisphenol-A phthalonitrile (0.2 g) were placed in an aluminum planchet and placed on top of a hot plate preheated to 300°-320° C. Under the above heat conditions, the polysulfone phthalonitrile had softened, but did not melt. The bisphenol-A phthalonitrile, having melted, acted as a solvent to reduce both the viscosity and problems associated with the processability of the high-molecular-weight polysulfone phthalonitrile. Moreover, upon curing, the bisphenol-A phthalonitrile entered into the backbone of the polymeric material. After 1 hour of heating at 300°–310° C. under reduced pressure conditions, the volatiles had been removed. Again, since the sample was less viscous relative to pure polysulfone phthalonitrile, the volatiles attributed to the polysulfone phthalonitrile were removed much easier and quicker. Moreover, any residual solvent (volatiles) acted as a plasticizer, since the softening temperature of the polysulfone phthalonitrile which had been degassed was higher relative to a sample which had not been degassed. To the melt of the degassed sample (bisphenol-A phthalonitrile and polysulfone phthalonitrile) at 220° C. was added 0.01 g of 4,4'-(p-phenylenedioxy)-dianiline. The resulting sample was placed in a preheated 220° C. oven and heated overnight (19 hours). The solidified sample was then postcured at 280° C. for 4 hours and at 310° C. for 18 hours. The polymer appeared to have better toughness relative to the shorter arylether sulfone units interconnecting the phthalonitrile polymerization sites.

EXAMPLE 8

Polymerization of Oligomeric Polyarylether Sulfone Phthalonitrile Monomer With an Average Molecular Weight of 19,350 (n=43)

Polysulfone terminated phthalonitrile (0.25 g) and bisphenol-A phthalonitrile (0.75 g) were thoroughly mixed and placed in an aluminum planchet. The bisphenol A phthalonitrile melted at approximately 200° C. The sample was heated further to 280° C. with stirring until the polysulfone phthalonitrile had dissolved. The resulting sample was placed in a specially designed desiccator containing a hot plate and heated at 280°–300° C. for 2 hours at reduced pressure. Volatiles associated with the polysulfone phthalonitrile had stopped coming from the liquid sample. The sample was placed in a preheated oven at 280° C. and heated for 48 hours. The cured sample was then cooled and checked for toughness; it was still brittle. The sample was then heated at 300° C. for 24 hours; the sample was less brittle. The temperature was increased to 325° C. and the sample was heated at this temperature for 18 hours—still somewhat brittle. Since bisphenol-A phthalonitrile was present in such a relatively large quantity to dissolve this polysulfone phthalonitrile, the bisphenol-A phthalonitrile probably exhibited the predominate effect on the physical properties of the cured polymer.

EXAMPLE IX

Fracture Toughness of Monomer with n=9

The formulation and cure cycle described above were used in preparing a 6"×6"×¼" plate. The fracture energy ($I_c$) measurements were made on 1.25" square compact tension specimens. A second plate was prepared and the fracture tests repeated. The average result from the 8 test specimens is given in Table I. Also listed are the results for several other materials. The value for the material based on the polysulfone phthalonitrile is substantially higher than those of the epoxy, the bisphenol-A phthalonitrile and also the addition polyimide, PMR-15.

TABLE I

| FRACTURE TOUGHNESS OF SELECTED POLYMERS | |
|---|---|
| Material | Fracture Toughness J/m² |
| Polysulfone - phthalonitrile | 473 |
| Bisphenol A - phthalonitrile | 99 |
| Narmco 5208 resin (Epoxy Resin) | 76 |
| PMR-15 (Addition Polyimide) | 200 |
| UDEL P1700 Polysulfone (Thermoplastic) | 3200 |

EXAMPLE X

Thermal Gravimetric Analysis (TGA) of monomer with n=9

The results of the TGA runs in nitrogen for the two samples of the above monomer are as follows. Weight loss begins slightly above 300° C. The weight loss is less than 10% at 450° C. and at 700° C. is 40 to 45%. These results are typical of those obtained on the phthalonitrile resins disclosed in previous issued U.S. patents, e.g. U.S. Pat. Nos. 4,233,123 and 4,234,712.

The results indicate that a significant advance has been made in increasing the toughness of a bis-phthalonitrile-based polymer. The polymer, prepared from a bis-(phthalonitrile)-terminated-(bisphenol-A/diphenyl sulfone) oligomer, showed over six times the fracture energy of a tetra-functional epoxy. Thermal gravimetric analysis showed that the polymer has roughly the same thermal stability as the earlier phthalonitrile resins.

The toughened polymer system of this invention would be especially useful as the organic matrix of advanced composites for aircraft and automobiles. Further the preliminary viscidity tests show that these polymers have a wide range of uses as adhesives, coatings and sealants.

Obviously many modifications and variations of the present invention are possible in light of the above teachings. It is therefore to be understood that within the scope of the appended claims the invention may be practiced otherwise than as specifically described.

What is claimed is:

1. An oligomeric polyarylether sulfone phthalonitrile monomer represented by the formula:

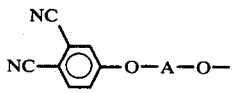

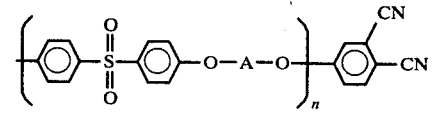

wherein A represents an aromatic unit having from 1 to 3 attached or fused aromatic rings, said rings being attached directly or through an aliphatic group, sulfur, or oxygen; and n represents an average value from 1 to 100.

2. The monomer of claim 1 wherein A represents a radical selected from the class consisting of the radicals of phenyl, diphenyl, terphenyl, anthracene, naphthalene, and phenanthrene.

3. The monomer of claim 2 wherein A represents a radical selected from the class consisting of phenyl and diphenyl.

4. The monomer of claim 1 wherein A is represented by the formula:

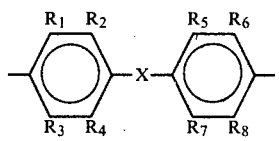

wherein X is selected from the class consisting of

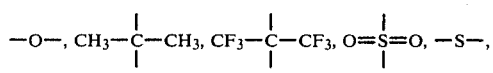

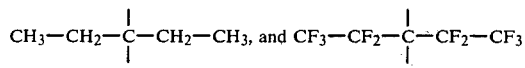

and $R_1$, $R_2$, $R_3$, $R_4$, $R_5$, $R_6$, $R_7$ and $R_8$ are selected from the class consisting of hydrogen, fluoride, methyl, and ethyl.

5. The monomer of claim 4 wherein $R_1$ through $R_8$ are —H.

6. The monomer of claim 5 wherein X is selected from the class consisting of —O—,

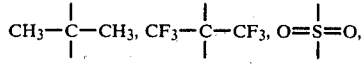

and —S—.

7. The monomer of claim 6 wherein X is selected from the class consisting of

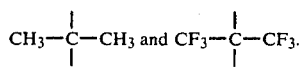

8. The monomer of claim 1 wherein A is represented by the formula:

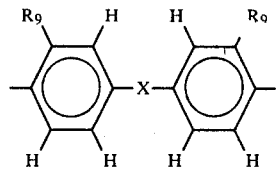

wherein X is selected from the class consisting of

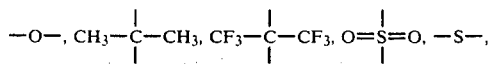

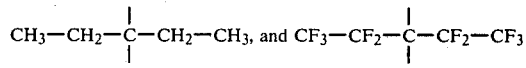

and $R_9$ is selected from the class consisting of bromide and chloride.

9. The monomer of claim 8 wherein X is selected from the class consisting of —O—,

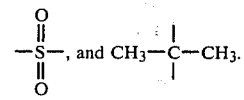

10. The monomer of claim 9 wherein X is selected from the class consisting of —O— and

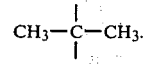

11. The monomer of claim 1, 2, 4, 5, 6, 7 or 8 wherein n is an average value from 1 to 4.

12. The monomer of claim 1, 2, 4, 5, 6, 7 or 8 wherein n is an average value from 5 to 15.

13. The monomer of claim 1, 2, 4, 5, 6, 7 or 8 wherein n is an average value from 16 to 50.

14. A method of preparing a bis phthalonitrile-terminated sulfone oligomeric monomer represented by the formula

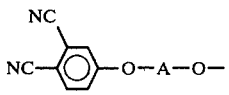

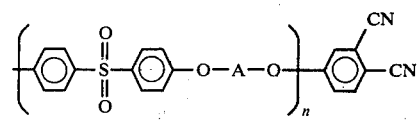

wherein A represents an aromatic unit having from 1 to 3 attached or fused aromatic rings, said rings attached directly or through an aliphatic group, sulfur, or oxygen; and n represents an average value from 1 to 100 which comprises admixing a dialkaline metal bisphenate represented by the formula:

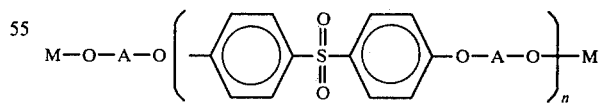

wherein A represents an aromatic unit having from 1 to 3 attached or fused aromatic rings, said rings being attached directly or through an aliphatic group, sulfur, or oxygen; M is an alkali metal and n represents an average value from 1 to 100 with a stoichiometric amount of 4-nitrophthalonitrile at a temperature from about 65° to 85° C. until the said monomer is produced.

15. The method of claim 14 wherein said temperature is from 70° to 80° C.

16. A phthalonitrile polymer obtained by heating an oligomeric polyarylether sulfone phthalonitrile monomer represented by the formula:

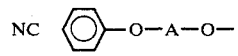
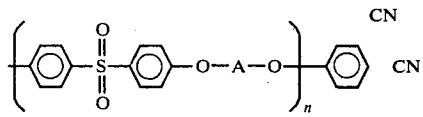

wherein A represents an aromatic unit having from 1 to 3 attached or fused aromatic rings, said rings being attached directly or through an aliphatic group, sulfur, or oxygen; and n represents an average value from 1 to 100 at a temperature from about the melting or softening point of said monomer to about the decomposition temperature of said polymer until polymerization is completed.

17. The polymer of claim 16 wherein A represents a divalent radical selected from the class consisting of the radicals of phenyl, biphenyl, terphenyl, anthracene, naphthalene and phenanthrene.

18. The polymer of claim 17 wherein A represents a radical selected from the class consisting of phenyl and biphenyl.

19. The polymer of claim 16 wherein A is represented by the formula:

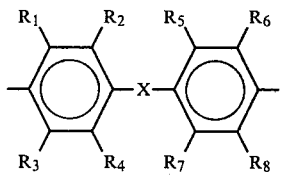

wherein X is selected from the class consisting of

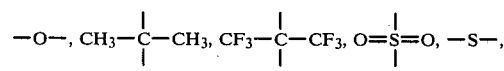

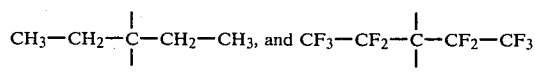

and $R_1$ through $R_8$ are selected from the class consisting of hydrogen, fluoride, methyl, and ethyl.

20. The polymer of claim 19 wherein $R_1$, through $R_8$ are —H.

21. The polymer of claim 20 wherein X is selected from the class consisting of —O—,

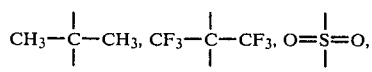

and —S—.

22. The polymer of claim 21 wherein X is selected from the class consisting of

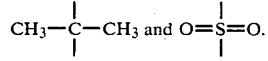

23. The polymer of claim 16 wherein A is represented by the formulae:

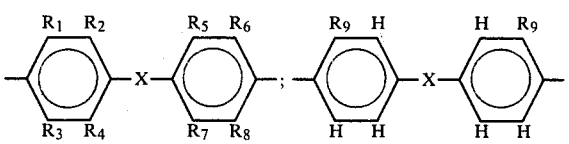

wherein X is selected from the class consisting of

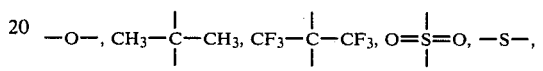

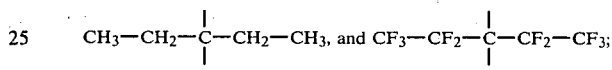

$R_9$ is selected from the class consisting of bromide and chloride.

24. The polymer of claim 23 wherein X is selected from the class consisting of —O—,

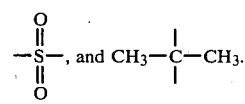

25. The polymer of claim 24 wherein X is selected from the class consisting of —O— and

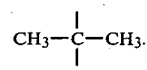

26. A mixed phthalonitrile polymer obtained by mixing, based on total phthalonitrile monomer mixture, from about 20 to less than 100 weight percent of an oligomeric polyarylether sulfone phthalonitrile monomer represented by the formula:

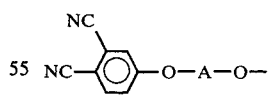
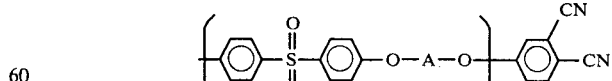

wherein A represents an aromatic unit having from 1 to 3 attached or fused aromatic rings, said rings being attached directly or through an aliphatic group, sulfur, or oxygen; and n represents an average value from 1 to 100 with one or more low-molecular-weight phthalonitrile monomers and heating said mixture from about the highest melting or softening point of the monomers to about the decomposition temperature of said mixed polymer until polymerization is completed.

27. The mixed polymer of claim 26 wherein A represents a radical selected from the class consisting of the radical of phenyl, biphenyl, terphenyl, anthracene, naphthalene and phenanthrene.

28. The mixed polymer of claim 26 wherein A is a radical selected from the group consisting of phenyl and biphenyl.

29. The polymer of claim 26 wherein A is represented by the formula:

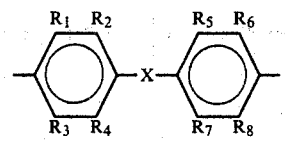

wherein X is selected from the class consisting of

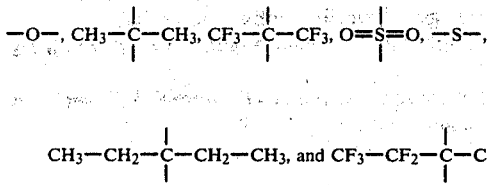

and $R_1$ through $R_8$ are selected from the class consisting of hydrogen, fluoride, methyl, and ethyl.

30. The mixed polymer of claim 29 wherein $R_1$ through $R_8$ are —H.

31. The mixed polymer of claim 30 wherein X is selected from the class consisting of —O—,

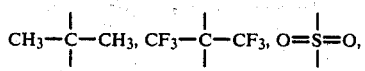

and —S—.

32. The mixed polymer of claim 31 wherein X is selected from the class consisting of

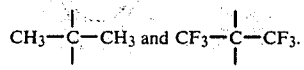

33. The polymer of claim 26 wherein A is represented by the formula:

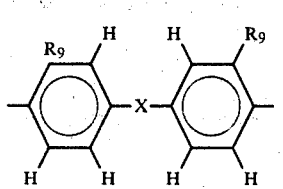

wherein X is selected from the class consisting of

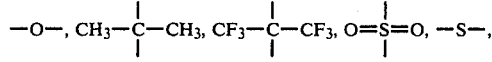

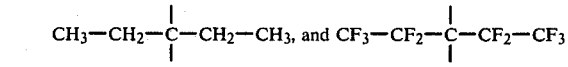

and $R_9$ is selected from the class consisting of bromine and chloride.

34. The polymer of claim 27 wherein X is selected from the class consisting of —O—, —S—, and

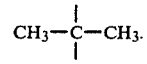

35. The polymer of claim 34 wherein X is selected from the class consisting of —O— and

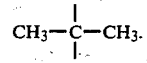

36. The polymer of claim 26, 28, 30, 32, or 35 wherein n is an average value from 1 to 4.

37. The polymer of claim 26, 28, 30, 32, or 35 wherein n is an average value from 5 to 15.

38. The polymer of claim 26, 28, 30, 32, or 35 wherein n is an average value from 16 to 50.

39. The mixed polymer of claim 26 wherein at least about 50 weight percent of said sulfone phthalonitrile monomer with n being an average value from 10 to 25 is copolymerized with a phthalonitrile monomer represented by the formula

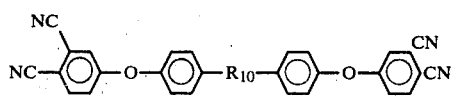

wherein $R_{10}$ represents a divalent radical selected from the class consisting of

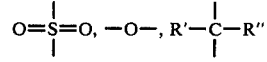

wherein R' is hydrogen or an alkyl radical with 1 to 6 carbon atoms and R" is hydrogen or an alkyl radical with 1 to 6 carbon atoms.

40. The mixed polymer of claim 39 wherein said sulfone phthalonitrile monomer with n being an average value from 9 to 25 is present in an amount from about 75 to 95 weight percent.

41. The mixed polymer of claim 40 wherein $R_{10}$ is a divalent radical selected from the class consisting of

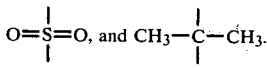

42. The mixed polymer of claim 28 wherein at least about 50 weight percent of said sulfone phthalonitrile monomer with n being an average value from 9 to 25 is copolymerized with a phthalonitrile monomer represented by the formula

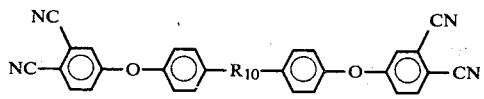

wherein $R_{10}$ represent a divalent radical selected from the class consisting of

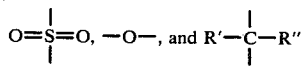

wherein R' is hydrogen or an alkyl radical with 1 to 6 carbon atoms and R" is hydrogen or an alkyl radical with 1 to 6 carbon atoms.

43. The mixed polymer of claim 42 wherein at least about 75 weight percent of said sulfone phthalonitrile monomer with n being an average value from 9 to 25.

44. The mixed polymer of claim 43 wherein $R_{10}$ is a divalent radical selected from the class consisting of

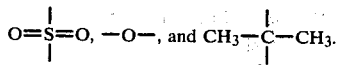

45. The mixed polymer of claim 29 wherein at least about 50 weight percent of said sulfone phthalonitrile monomer with n being an average value from 9 to 25 is copolymerized with a phthalonitrile monomer represented by the formula

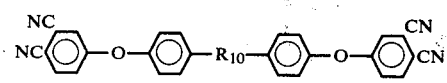

wherein $R_{10}$ represent a divalent radical selected from the class consisting of

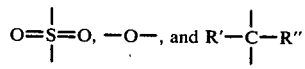

wherein R' is hydrogen or an alkyl radical with 1 to 6 carbon atoms and R" is hydrogen or an alkyl radical with 1 to 6 carbon atoms.

46. The mixed polymer of claim 45 wherein from about 75 to 95 weight percent of said sulfone phthalonitrile monomer with n being an average value from 9 to 25.

47. The phthalonitrile polymer of claim 26 wherein from about 60 to about 85 weight percent of the total monomer weight of said sulfone phthalonitrile monomer having n from 10 to 25 is polymerized with said sulfone phthalonitrile monomer having n from 1 to 4.

48. The polymer of claim 47 wherein A is represented by the formula:

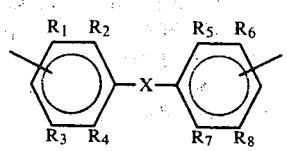

wherein X is selected from the class consisting of

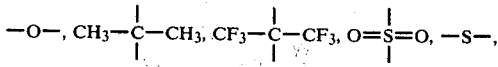

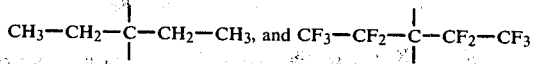

and $R_1$ through $R_8$ are selected from the class consisting of hydrogen fluoride, methyl and ethyl.

49. The polymer of claim 48 wherein $R_1$ through $R_8$ are —H.

50. The polymer of claim 49 wherein X is selected from the class consisting of —O—,

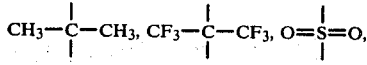

and —S—.

51. The polymer of claim 50 wherein X is selected from the class consisting of

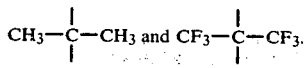

52. The polymer of claim 26 wherein A is represented by the formula:

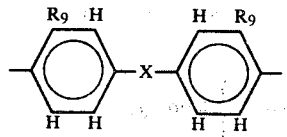

wherein X is selected from the class consisting of

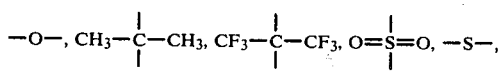

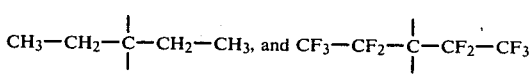

and $R_9$ is selected from the class consisting of bromide and chloride.

53. The oligomer of claim 52 wherein X is selected from the class consisting of

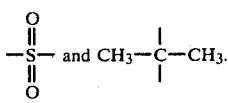

54. A phthalonitrile polymer obtained by heating a bis-phthalonitrile-terminated sulfone oligomeric monomer represented by the formula:

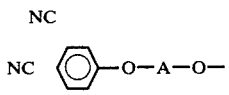

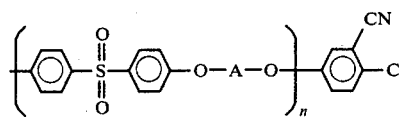

wherein A represents an aromatic unit having from 1 to 3 attached or fused aromatic rings, said rings being attached directly or through an aliphatic group, sulfur or oxygen; and n represents an integer from 1 to 100 with about 1 to 20 weight percent of the total weight of a phenol or a primary amine at a temperature from about the melting or softening point of said monomer to about the decomposition temperature of said polymer until polymerization is completed.

55. A mixed phthalonitrile polymer obtained by mixing at least about 20 weight percent of the total weight of an oligomeric polyarylether sulfone phthalonitrile monomer represented by the formula:

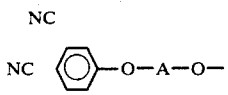

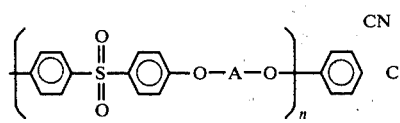

wherein A represents an aromatic unit having from 1 to 3 attached or fused aromatic rings, said rings being attached directly or through an aliphatic group, sulfur or oxygen, said n represents an integer from 1 to 100, from about 1 to 20 weight percent of a phenol or a primary amine, and one or more low-molecular-weight phthalonitrile monomers; and heating said mixture at a temperature from about the highest melting or softening point of said monomers to about the decomposition temperature of said mixed polymer until polymerization is completed.

56. A phthalonitrile polymer obtained by mixing an oligomeric polyarylether sulfone phthalonitrile monomer, represented by the formula:

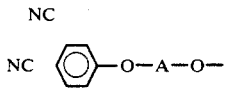

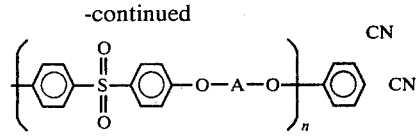

wherein A represents an aromatic unit having from 1 to 3 attached or fused aromatic rings, said rings being attached directly or through an aliphatic group, sulfur, or oxygen and n represents an integer from 1 to 100, with a stoichiometric amount of a salt selected from the group consisting of stannous chloride dihydrate, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof or a metal selected from the group consisting of copper, iron, zinc, nickel, chromium, molybdenum, vanadium, beryllium, silver, mercury, tin, lead, antimony, calcium, barium, manganese, magnesium, cobalt, palladium, platinum and mixtures thereof; and heating the mixture at a temperature from abut the melting or softening point of said monomer to about the decomposition temperature of said polymer until polymerization is completed.

57. A mixed phthalonitrile polymer obtained by mixing, based on total phthalonitrile monomer mixture, at least about 20 weight percent of an oligomeric polyarylether sulfone phthalonitrile monomer represented by the formula:

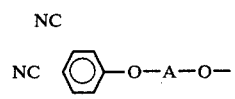

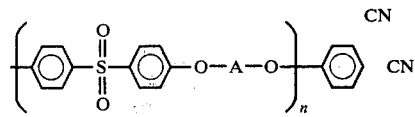

wherein A represents an aromatic unit having from 1 to 3 attached or fused aromatic rings, said rings being attached directly or through an aliphatic group, sulfur, or oxygen and n represents an integer from 1 to 100, from about 1 to 20 weight percent of a phenol or a primary amine, one or more low-molecular-weight phthalonitrile monomers, and a stoichiometric amount of a metal selected from the group consisting of copper, iron, zinc, nickel, chromium, molybdenum, vanadium, beryllium, silver, mercury, tin, lead, antimony, calcium, barium, manganese, magnesium, cobalt, palladium, platinum, and mixtures thereof or a salt selected from the group consisting of stannous chloride dihydrate, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof and heating the mixture at a temperature from about the highest melting or softening point to about the decomposition temperature of said mixed polymer until polymerization is completed.

* * * * *